(12) United States Patent
DeVos

(10) Patent No.: US 7,831,562 B1
(45) Date of Patent: Nov. 9, 2010

(54) BACKUP AND RESTORE OPERATIONS USING DISTRIBUTED CONTROL INFORMATION

(75) Inventor: Steven R. DeVos, Kirkland, WA (US)

(73) Assignee: Symantec Corporation, Mountain View, CA (US)

( * ) Notice: Subject to any disclaimer, the term of this patent is extended or adjusted under 35 U.S.C. 154(b) by 389 days.

(21) Appl. No.: 11/761,653

(22) Filed: Jun. 12, 2007

(51) Int. Cl.
*G06F 7/00* (2006.01)
*G06F 17/00* (2006.01)

(52) U.S. Cl. .................. 707/640; 707/644; 707/645

(58) Field of Classification Search .................. None
See application file for complete search history.

(56) References Cited

U.S. PATENT DOCUMENTS

| | | | |
|---|---|---|---|
| 2004/0117438 A1* | 6/2004 | Considine et al. | 709/203 |
| 2006/0195790 A1* | 8/2006 | Beaupre et al. | 715/727 |
| 2006/0206747 A1* | 9/2006 | Nakano et al. | 714/4 |
| 2007/0061385 A1* | 3/2007 | Clark et al. | 707/204 |
| 2007/0179999 A1* | 8/2007 | Kamei et al. | 707/204 |

\* cited by examiner

*Primary Examiner*—Khanh B Pham
*Assistant Examiner*—Azam Cheema
(74) *Attorney, Agent, or Firm*—Meyertons, Hood, Kivlin, Kowert & Goetzel, P.C.; Dean M. Munyon

(57) ABSTRACT

Backup and restore operations in a distributed data system are described. In one embodiment of a backup operation, a computing system includes a media server, and two or more distributed data sources. The media server is configured to establish a first connection with an agent executing on the first data source and receives control information specifying one or more additional data sources to contact to continue the backup operation. Agents on the additional data sources pass control information and/or backup data via each respective connection until the backup operation is complete. In some embodiments, two or more concurrent connections may be established between the media server and distributed data sources. In this manner, a backup operation may be performed for distributed data using control information supplied by the distributed data sources.

20 Claims, 10 Drawing Sheets

BACKUP AND RESTORE OPERATIONS USING DISTRIBUTED CONTROL INFORMATION

BACKGROUND OF THE INVENTION

1. Field of the Invention

This invention relates generally to computer systems and, more particularly, to the backup and restore of distributed data.

2. Description of the Related Art

It has become common for organizations to employ distributed applications installed on a network of computer systems to manage a wide variety of information, e.g., enterprise data. There are many different types of distributed applications. Microsoft® Exchange Server®, for example, provides an organization with a messaging (e-mail) and collaboration environment. As another example, Microsoft SharePoint® Portal Server provides a unified view (on a website) of information from various applications. Still further, Microsoft's® Distributed File System (DFS) provides a single name space for combining the views of files on multiple, networked computers into a single, hierarchical view.

A distributed application may work with a set of distributed data sources. For example, a distributed application may have access to one or more database repositories, file systems, or other storage media, either local or remote. Various design decisions determine the number and location of data sources associated with a given distributed application. Such decisions may include the quantity of data stored, required frequency of access to the data, network latency between servers on which the data is stored, and the functionality required of the application software installed on each server.

The protection of data such as enterprise data includes performing a backup of data sources associated with distributed applications. During a backup operation, data from multiple data sources, including metadata, may be copied and stored on backup media, access to which is provided by a "media server." It is common for a distributed application to have a sufficiently large amount of data to be backed up such that multiple backup tapes or other media may be required.

Specialized software tools for performing backup and restore of distributed applications have been widely implemented. For example, BackupExec® from Veritas Software Corporation is a commercial product for backing up enterprise data. In some instances, data source servers were typically configured to transmit backup data via a "relay" server to the media server. However, as distributed applications grow in size, current techniques may become more and more impractical to implement. Such difficulties are particularly prevalent where a distributed environment encompasses, for example, a variety of networked computer systems and software environments that are located at various geographic locations.

Accordingly, different techniques for backup and restore of distributed application data are desired.

SUMMARY OF THE INVENTION

Various embodiments of systems, methods, and computer-readable media storing program instructions for performing backup and restore operations of distributed data are disclosed.

In one embodiment, a system for performing a backup operation includes a media server and a plurality of servers, including a first server, coupled to the media server via one or more networks, where one or more of the plurality of servers stores data to be backed up. The media server includes a processor subsystem and a memory subsystem that stores program instructions executable by the processor subsystem. The program instructions include instructions executable to establish a first network connection with the first server to initiate the backup operation and to receive first control information over the established first network connection, where the first control information includes information indicative of one or more additional servers within the plurality of servers. The instructions are further executable to subsequently establish network connections with the one or more additional servers indicated by the first control information, to receive data to be backed up via at least one of the established network connections, and to store the received data on a storage medium accessible to the media server.

In one embodiment, an agent may be operating on the first server. This agent may be executable to provide second control information to the media server, where the second control information indicates that the media server is to establish a network connection with one or more subsequent servers within the plurality of servers. The first agent may further be executable to provide data to be backed up from the first server to the media server. The system may further include a second agent executing on one of the one or more subsequent servers. In one embodiment, the second agent may be executable to provide additional control information to the media server. For example, such additional control information may specify establishing one or more connections to additional servers (e.g., sequentially or concurrently). Alternately, the second agent may be executable to provide final control information to the media server, the final control information indicating that no more servers within the plurality of servers are to be contacted by the media server as part of the backup operation.

The plurality of servers may store data used by a distributed application, which may, in one embodiment, be a collaborative application. The plurality of servers may also include servers located in different domains. The first network connection may be an NDMP connection, a modification thereof, or any other suitable type of network connection.

Embodiments include various systems, methods and computer-readable media that store program instructions executable to implement the techniques disclosed herein. These techniques may be implemented on media servers and/or computer systems storing data to be backed up. Corresponding restore operations are also contemplated.

The Summary is meant only to provide a simplified introduction to the disclosed subject matter and is not meant to limit the scope of the claims.

DETAILED DESCRIPTION

Figure 1:
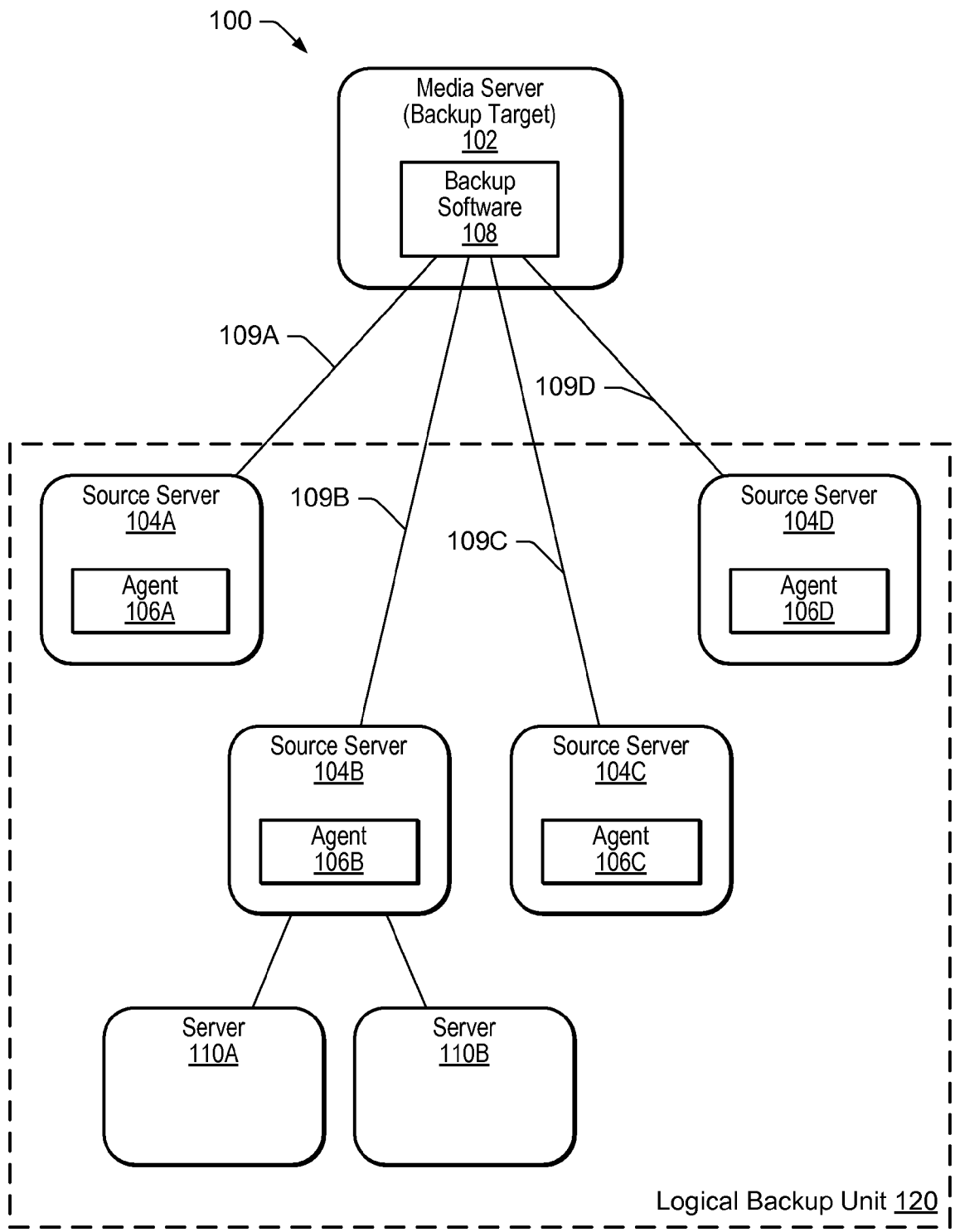
FIG. 1 illustrates one embodiment a system for performing backup or restore operations.

Referring now to FIG. 1, a block diagram of one embodiment a system for performing backup or restore operations is illustrated. A backup operation may include the selection, collection, packaging, and/or archiving of backup data. (Throughout this disclosure, when the term "backup" is used, a corresponding "restore" is also contemplated.) As shown, system 100 includes a media server 102 coupled to source servers 104 (represented in FIG. 1 by reference numerals 104A-D) via a respective network connection 109 (shown as 109A-D). (Source server 104 may be any suitable computer system that stores data; the term "source" merely connotes that server 104 includes data that can be the "source" of a backup operation. Media server 102, by way of contrast, is the "target" of a backup operation.) Optionally, system 100 may include servers 110 that do not have a direct network connection to media server 102, but instead are coupled to one of source servers 104 (here, to source server 104B).

Source servers 104 store distributed data that may be backed up (i.e., stored in a location such as media server 102). For example, source servers 104 may store information corresponding to a distributed application running on a plurality of source servers (e.g., sources servers 104A-D). As used herein, a "distributed application" is an application made of software components (e.g., application "modules") that are physically located on different computer systems (e.g., different servers). A distributed application may give the appearance, however, of executing on a single computer system. For example, a distributed application may use an "application server" that provides query and control methods for other servers to access their related data that may be stored on multiple additional "data" servers. In various embodiments, a distributed application includes software executing to provide functionality for an Internet website. In one embodiment of a distributed application, Microsoft's SharePoint® Portal Server may be configured using an application server that coordinates queries for data managed by multiple data servers. In order for one of these data servers to find a set of related data, it may need to communicate with a coordinating application server.

When a distributed application is to be backed up, the data may span more than one server or group of servers. Accordingly, backup of a distributed application may involve backing up data from more than one storage location or system. Source servers 104 may be a single computer system, a collection of computer systems configured to operate collectively, etc.

Optionally, certain source servers 104 may access backup data on other servers to which they are coupled. For example, consider servers 110A and 110B depicted as being accessible via source server 104B. These servers 110A-B may include data to be backed up, but which do not have a direct connection to media server 102. In one embodiment, source server 104B may, using agent 106B, access servers 110A-B and relay their backup data to media server 102. In some embodiments, servers 110 are "appliance" servers on which agents 106, for some reason, cannot be installed.

Specific data may be selected for a backup operation. For example, in system 100, a logical backup unit (LBU) 120 is shown. LBU 120 identifies data corresponding to a particular backup operation, and may not include all of the data for a particular set of distributed data. (While LBU 120 is shown as identifying source servers 104A-D, an LBU can also specify a subset of data on one or more servers.) This grouping of data may include data that is related (e.g., data and corresponding encryption keys) or not. Thus, any arbitrary grouping of data may be associated and defined as a logical backup unit. An LBU may include data that is distributed or located on a single system.

In some embodiments, media server 102 includes a plurality (i.e. a cluster) of backup servers, each of which is configured to maintain connections to one or more source servers. In such a cluster configuration, media server 102 may be equipped to handle a large data throughput by using numerous parallel network connections to various source servers.

As shown, media server 102 includes, in one embodiment, backup software 108 that is executable by one or more processors on media server 102 to store data to be backed up on one or more storage media. As used herein, "software" can include any form of executable code, either compiled or interpreted, and may include embedded instructions, local or remote code modules, user interfaces, or any other form of computer-executable instructions. Backup software 108 may, for example, be used to backup some or all of a distributed application running on source servers 104. Backup software 108 may also be used to select LBU 120.

In one embodiment, media server 102 is configured to connect to source servers 104 via a respective connection 109. Connection 109 may be any suitable network connection, such as a wired or wireless network, as desired. The network protocol used for connection 109 may be chosen from a variety of protocols at any physical and logical level in the protocol stack, including a connection made using a Network Data Management Protocol (NDMP). See, e.g., www.ndmp.org.

In the embodiment shown, each source server 104 includes an agent 106. As used herein, the term "agent" refers to a software component that, when executed by one or more processors on the respective source server 104, performs tasks associated with a backup operation. The agent software component may be implemented in various forms, such as a driver, DLL, applet, add-in, plug-in, application program, etc. Agents 106 may, for example, communicate with backup software 108 by transferring control information or backup data to or from media server 102. Agents 106 may also collect backup data on their respective source server 104, package this backup data, and transmit this backup data to the media server 102 for storage. As will be described below, an agent 106 may indicate a subsequent source server for media server 102 to interact with in processing a current backup operation. In some embodiments, agents 106 operate independently and asynchronously with respect to backup software 108, as will be described in further detail below.

In one embodiment of FIG. 1, logical backup unit 120 is specified as including data on source servers 104A-D, each of which is configured to execute a respective agent 106A-D. While source servers 104 are not shown as connected together, it will be appreciated that in some embodiments, source servers 104 may be themselves interconnected via one or more networks. For example, servers 102, 104 and 110 may all be coupled to the same network.

Figure 2:
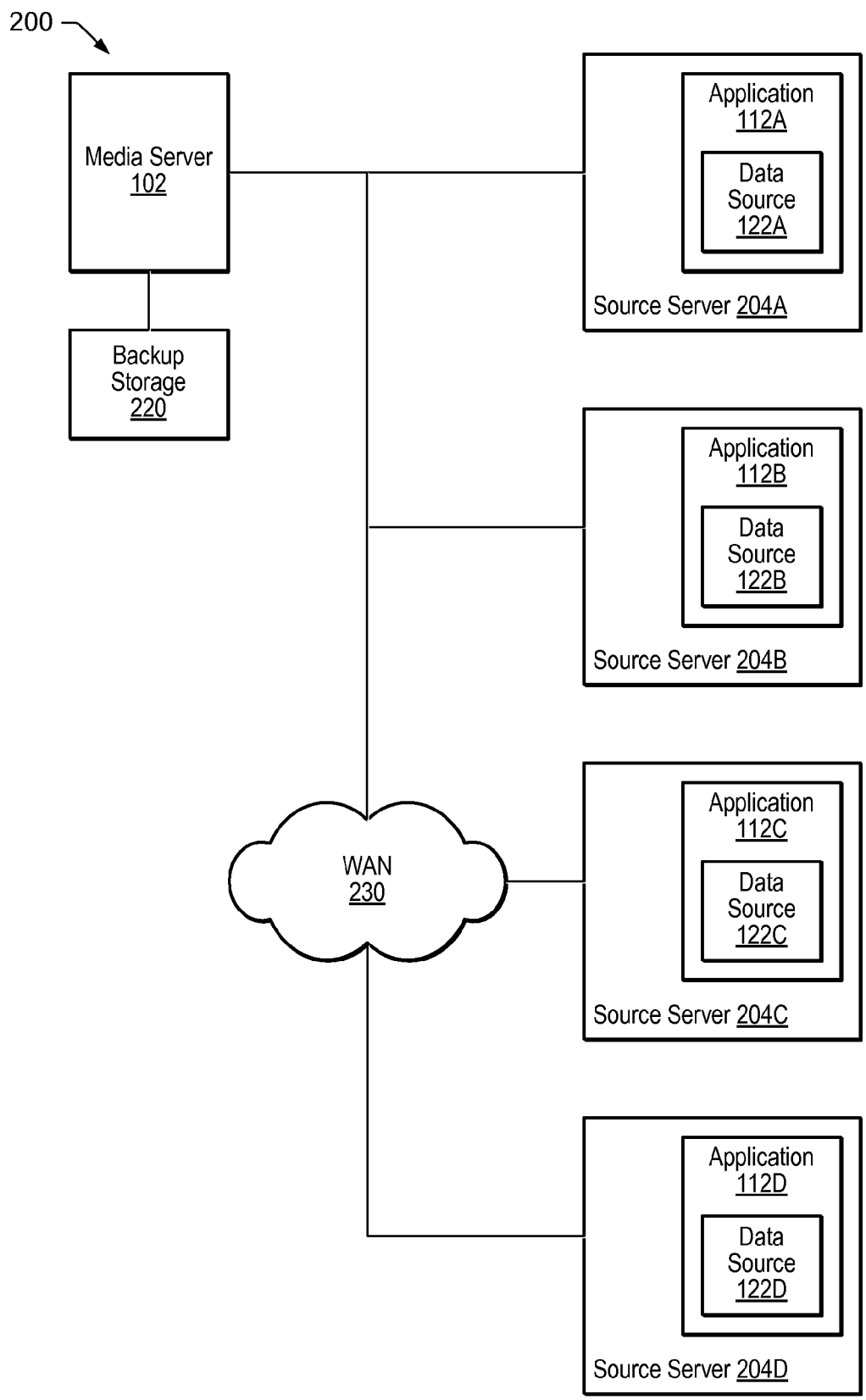
FIG. 2 illustrates one embodiment of a network including a distributed application.

Referring now to FIG. 2, one embodiment of a system for performing a backup or restore of a distributed application is illustrated. As shown, system 200 includes a media server 102 coupled to source servers 204 (shown, for example, as servers 204A-D). Media server 102 is coupled to backup storage 220, which may be any suitable storage media or architecture. Source servers 204 may be connected via any suitable means or topology. For example, source servers 204C-D are shown as connected to media server 102 and source servers 204A-B via a wide-area network 230, which may include one or more networks. In one embodiment WAN 230 is or includes the Internet.

Each source server 204 in the embodiment shown in FIG. 2 is running software that is part of a given distributed application. For example, one or more of source servers 104 may be a data server, and thus include a data source 122. For example, a data source may include database, a file system, a non-volatile memory, or any other suitable data storage device. For example, data source 122D may be a database containing data such as user authentication and capabilities data. Data servers may be responsible for managing storage and retrieval operations on a database in its respective data source 122 on behalf of other servers of application 112.

One example of a distributed application on which the techniques disclosed herein can be used is Microsoft® Share-Point® Portal Server, which may include a SharePoint® front end server ("FES") and one or more subordinate SharePoint® source servers. Prior to performing a backup operation according to one embodiment of the techniques described herein, an agent is installed on each individual SharePoint® source server, along with control information. In addition to the information mentioned above, the control information may also specify additional actions to be taken by an agent. For example, a lockdown on backup data or source servers may be performed in conjunction with performing the backup. Additionally, the credentials of a user performing the backup operation may be validated by one or more agents involved in a backup operation.

In one embodiment, a data snapshot of SharePoint® source servers may be taken to catalog the actual data present at the time of backup. In some embodiments, certain control information may cause the media server to return to the ISS (i.e., establish a second connection with the ISS) upon completion of the backup operation. One reason for returning to the ISS in a SharePoint® environment is that the ISS is the Share-Point® FES, which maintains information about and controls data storage. The SharePoint® data servers may not be equipped with intelligence for managing their locally residing data. Thus, the FES may also initiate a LOCK operation at the start of the backup operation of the LBU, and an UNLOCK operation upon completion, in order to protect the consistency of the backup data. During a SharePoint® restore operation, after the restored data has been copied to the Share-Point® source servers, the FES must be reconfigured with the new data, using metadata that was included in the LBU.

One or more of source servers 204 may be application servers. For example, a source server 204 that is an application server may provide various services, including data encryption/decryption, configuration management, indexing content for later searches, analyzing web traffic patterns, failover management, and other functions common to the distributed application environment. Source server 204 acting as an application server may store data in a local file system (for example, data source 122B), including encryption keys, configuration tables, search index results, web traffic statistics, and network status information, among others.

In some embodiments of distributed application 112, various components may be installed on source servers 204. For example, one source server 204 may be a web server that provides web content to visitors to various web sites. Such a source server 204 may store some data locally in data source 122C (for example, error logs, performance settings, security settings, etc.), while storing the bulk of its data (for example, web content) in a database on another server (for example, another of source servers 204).

Numerous other configurations of distributed application 112 may be installed on networked system 200 in various embodiments, with different numbers of data servers and application servers, depending on the desired functionality, hardware availability, reliability requirements, number of users, and other factors.

Figure 3:
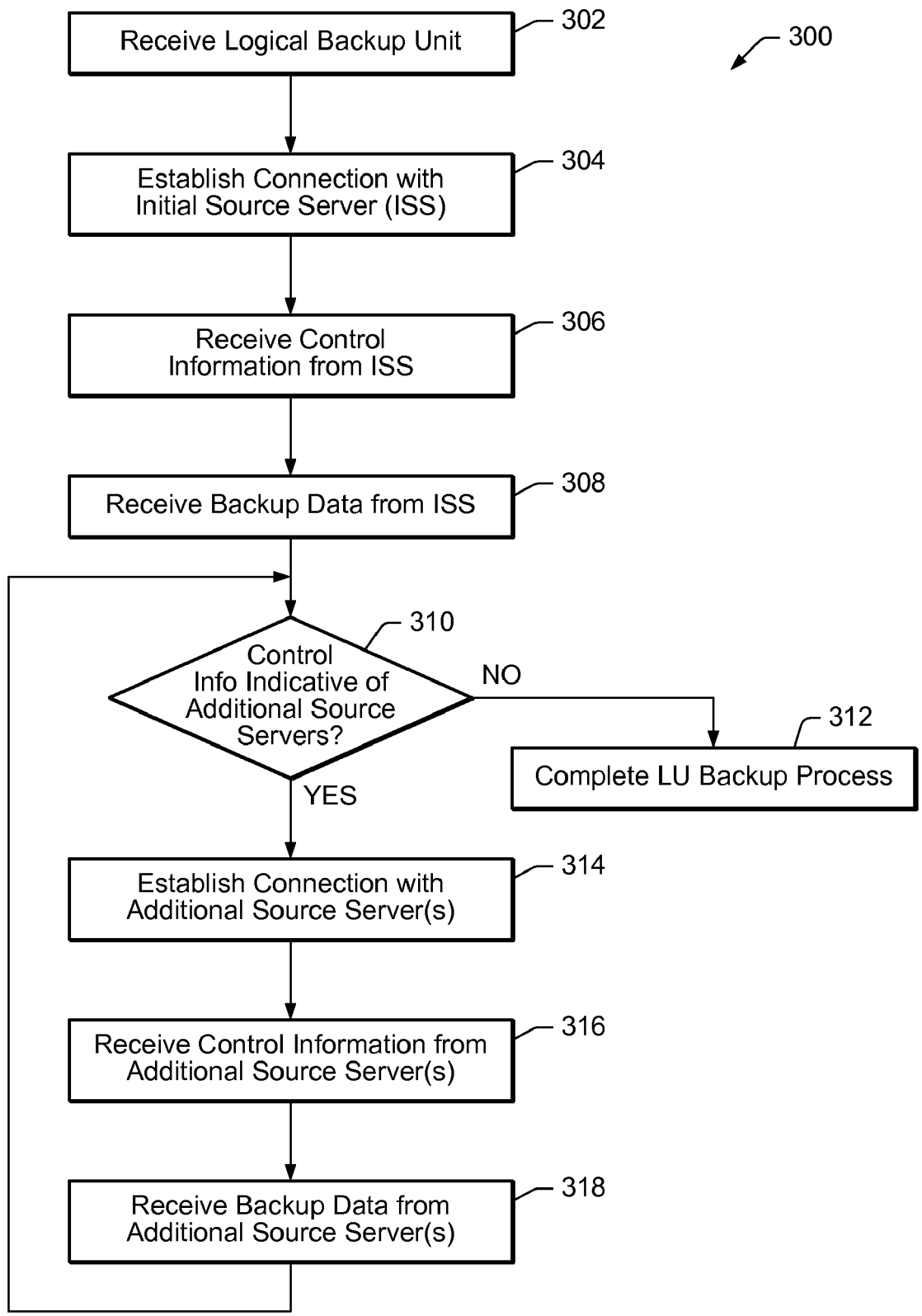
FIG. 3 illustrates one embodiment of a procedure that may be used to perform a backup operation on a distributed application.

Referring now to FIG. 3, a flowchart of one embodiment of a method for performing a backup operation on distributed data is shown. (A corresponding restore process is depicted with respect to FIG. 4 described below.) In various embodiments, method 300 is executable on enterprise data systems. As noted below, certain portions of method 300 are optional. Additionally, it is contemplated that certain portions of method 300 may be performed in a different order than the exemplary embodiment of FIG. 3. In one embodiment, method 300 is performed on a server such as media server 102.

Method 300 commences with step 302, in which a logical unit to be backed up is received. In one embodiment, backup software 108 executing on media server 102 is used to select logical backup unit 120. In various embodiments, a name specifying the selected logical backup unit 120 along with a specification (i.e., the domain name or network address) of an initial source server ("ISS") are determined or received in step 302. As described below, the ISS simply represents a first source server that media server 102 will connect to in performing the desired backup operation. For example, source server 104A may be designated as the ISS. In various embodiments of method 300, backup software 108 is configured to begin executing a backup operation using the logical backup unit name and the specification of the ISS. Thus, backup software 108 may not have any indication of additional source servers at the moment the backup operation commences.

In step 304, a connection with the specified ISS is established. Step 304 may include backup software 108 connecting with an agent 106 executing on the ISS. For example, backup software 108 may connect with agent 106A on source server 104A. In various embodiments, the ISS may be any one of source servers 104 that is configured to execute a corresponding agent 106.

A connection between the media server 102 and source servers 104 may be established using a variety of network protocols. In one embodiment, a network protocol based on NDMP may be used, either directly or using a library of protocol functions. In various embodiments, backup software 108 and agents 106 are configured to communicate with a common set of Application Programming Interface (API) functions for transferring data, signals, messages, etc. The communication and/or data transfer may be synchronous, asynchronous, burst mode, packet mode, or employ numerous other methodologies in various embodiments.

After a connection has been established in step 304, control information is received from the ISS in step 306. As used herein, "control information" refers to information that specifies one or more tasks for backup software 108 to perform as part of a backup (or restore) operation. In various embodiments, control information may include an indication (e.g., a list) of one or more additional source servers, from which the media server is to collect backup data to continue the backup operation. For example, control information may specify that, after completing a connection with source server 104A, media server is to establish a connection with source server 104B to continue a backup operation. In some embodiments, control information may also include connection information (such as network address, domain, login information, etc.) for one or more source servers. Control information may further specify that backup or restore data is to be transferred, and may also specify further parameters for such data (i.e. metadata, security information, connection information, file system information, database information, etc.). In various embodiments, control information for each specific source server 140 is prepared and maintained locally for use by the corresponding local agent 106. The control information may then be transmitted to backup software 108 running on media server 102. Control information may be prepared in advance of performing a backup operation, and may include information that is particular to a specific source server.

In step 308, backup data is received from the ISS. Note that step 308 is optional, as the ISS may simply transmit control information to backup software 108. For example, the ISS may not itself store any data to be backed up, but may instead indicate to backup software 108 one or more additional source servers to contact. In such an instance, step 308 would not be performed.

Backup data may be received from the ISS in step 308 in a synchronous or asynchronous manner. The ISS may send the entire backup data in a single transmission, or may use multiple transmissions to send backup data in portions, or in a continuous manner (data streaming). Thus, backup data may be portioned in arbitrarily small elements for transmission. Backup data received in step 308 may originate from the ISS, or from another system coupled to the ISS. In various embodiments, the agent 106 executing on the ISS may package and/or otherwise prepare the data prior to transmission, for example by applying a compression or encryption technique.

In step 310, a determination is made whether the current control information (e.g., the control information received in step 306) is indicative of additional source servers. Step 310 may be performed at various times relative to step 308. Step 310 may be performed repeatedly at various stages in method 300 until the backup operation is complete. If the determination in step 310 is NO, then step 312 is executed. In step 312, the backup operation for logical backup unit 120 is completed. In various embodiments, step 312 includes all operations required to close out the backup operations, including termination of connections, closing of files, etc. If, on the other hand, the determination in step 310 is YES, then the method continues to step 314.

In step 314, a connection is established with an additional source server. For example, according to the control information received by backup software 108 by agent 106A in step 306, backup software 108 may cause media server 102 to establish a connection with source server 104B in step 314. Control information may include instructions for connecting to one or more additional source servers. For example, control information that connections are to be established concurrently with two or more source servers (e.g., 104B and 104C).

In step 316, control information is received from an additional source server. In one example, control information is received from agent 106B in step 316, further specifying that a connection to source server 104C should be established to complete the backup operation. In some embodiments, the control information may specify all of the subsequent additional source servers 104 required to complete the backup operation. For example, the control information received in step 316 may specify each of the additional source servers 104C and 104D. Step 316 may be optional, as a particular source server may include only data and thus not pass control information to media server 102. For example, source server 104A may provide control information to media server 102 indicating to establish a connection concurrently with servers 104B and 104C. Source server 104C may then provide data and control information to media server 102, where the control information is indicative of server 104B, while source server 104B merely provides data to media server 102. Accordingly, in some embodiments, a given source server 104 may not provide any control information to backup software 108 on media server 102.

In step 318, backup data is received from the one or more specified additional source servers. Step 318 may be optional for a given server. As noted with respect to step 308, the transfer of backup data in step 318 may be synchronous or asynchronous. The backup data transmitted in step 318 may be packaged and prepared by the transmitting source server prior to transmission. In some embodiments, the source server collects the backup data from another system, for example such as server 110, and relays the backup data to the media server 102.

As noted, in steps 314-318, additional backup data may be retrieved from one or more additional source servers. The connections to any one or more source servers may be synchronous or asynchronous. In an example of a synchronous connection, a connection between media server 102 and source server 104B may first be established and terminated, before a subsequent connection to source server 104C is established. In an example of an asynchronous connection, a connection between media server 102 and source server 104B may first be established, and immediately be followed by a subsequent establishment of a concurrent connection to source server 104C. In various embodiments, the nature of the connection to the source server (e.g., synchronous or asynchronous) may be specified by the corresponding control information. For example, the control information received from agent 106A may specify that concurrent connections to source servers 106B and 106C are to be established by media server 102, or that source servers 106B and 106C are to be contacted sequentially. In various embodiments, the connection to a given source server remains established (or open) as long as backup data and/or control information is being transmitted to the media server. Accordingly, media server 102 may be configured to establish and maintain a plurality of physical and/or logical connections (concurrently and/or sequentially) for receiving backup data from a variety of source servers 106.

Accordingly, method 300 may be used to perform a distributed backup operation in which media server 102 "knows" only an initial server to contact. The initial server may then pass control information specifying one or more additional servers to contact in order to continue the backup operation. Each of these additional servers typically provides backup data and/or control information to media server 102. (Generally speaking, at least one of source servers 104 contacted during method 300 will provide backup data to media server 102.) Method 300 thus allows a backup operation to be performed with a minimum of "intelligence" required by media server 102, which need not "know" all the servers associated with LBU 120 at the time the backup operation is initiated.

The techniques described herein provide a means for initiating a backup operation at the media server that may be independent of a particular distributed application. In other words, the backup operation may be initiated at the media server in a consistent manner for various distributed applications, rather than being dependent on the particular distributed application being backed up. It is further noted that agents 106 and backup software 108 may communicate during the course of the backup operation. For example, the size of the backup data, the available storage at the media server, and the estimated time for transmission of the backup date may be exchanged between agents 106 and backup software 108, as desired. In a similar manner, a restore operation may be initiated without detailed knowledge of the application being restored at the media server according to the techniques disclosed herein.

Figure 4:
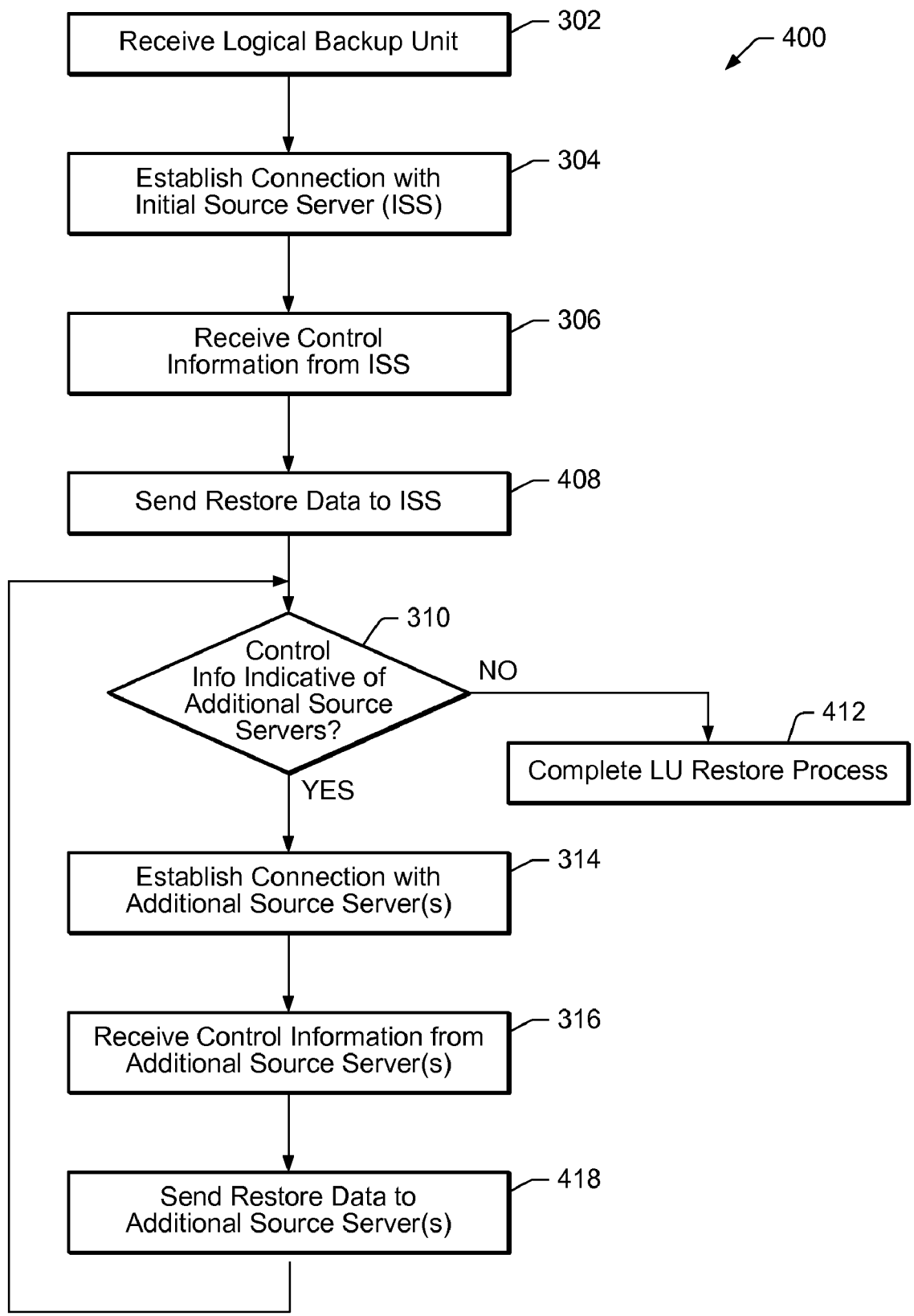
FIG. 4 illustrates one embodiment of a procedure that may be used to perform a restore operation on a distributed application.

Referring now to FIG. 4, a method 400 illustrates in flowchart form a restore operation for a distributed application. In various embodiments, method 400 is executable on enterprise data systems, for example on enterprise data systems 100, 200, or the systems shown in FIGS. 5A-D. Method 400 illustrates a restore operation that is similar to the backup operation of method 300. It is noted that method 400 accordingly shares numerous method steps with method 300, which are numbered identically.

Method 400 is executable by backup software 108 to perform a restore process on an enterprise data system. In various embodiments, the restore operation as shown in method 400 may be used for installing or overwriting data associated with distributed application 112.

In method 400, steps 302-306, 310, 314-318 are executed similarly as previously described for method 300. For example, in steps 306 and 316, the control information may be indicative of source servers 106 to which restore data is to be transmitted. The control information may further indicate the portion of the restore data that a particular source server was configured to receive, and optionally, what portion was intended for an additional source server. In step 408, restore data is sent to the ISS. In various embodiments, backup software 108 sends restore data to the ISS in step 408. The restore data may be sent to the ISS in a synchronous or asynchronous manner. The restore data may be destined for the ISS, or for another system coupled to the ISS. After receiving the data, agent 106 executing on the ISS may process the data prior to restoration, for example by applying a decompression or decryption technique.

In method 400, if the determination in step 310 is NO, then step 412 may be executed. In step 412, the restore process for logical backup unit 120 is completed, which includes any "close-out" tasks or processing steps. In step 418, restore data is sent to an additional source server. In some embodiments, step 418 is optional. As noted with respect to step 408, the transfer of restore data in step 418 may be synchronous or asynchronous. Restore data transmitted in step 418 may be processed by the receiving source server after transmission. In some embodiments, the source server transmits the restore data to another system, for example such as server 110, by relaying the restore data from the media server 102.

Figure 5:
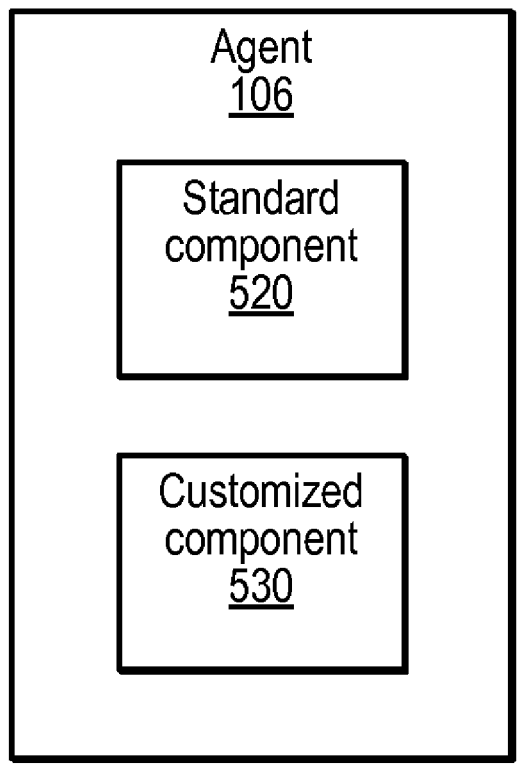
FIG. 5 illustrates one embodiment of an agent software component.

Referring now to FIG. 5, a block diagram illustrates one embodiment of an agent 106. Agent 106 is a software component that is executable on a source server 104, and may include a standard component 520 and a customized component 530. In some embodiments, the standard component 520 is common to all agents 106 installed on source servers 104. The standard component 520 may include executable code, a task list (e.g. in the form of a script), or a processing component capable of executing commands or instructions. The standard component 520 may also include a network communications interface, for example, for communicating with backup software 108. In various embodiments, the customized component 530 includes executable code and information that is specific to a particular source server 104. For example, the customized component 530 for a first source server 104 may include a first set of control information to pass to media server 102, while a second source server 104 may includes a set of control information to pass to media server 102. Note that although components 520 and 530 are shown as logically separate in FIG. 5, a given agent may have only a single component in various embodiments. Furthermore, it is not necessarily the case that an agent has a standard component 520, as the entire component could be specific to a particular source server.

Referring now to FIGS. 6A-6D, block diagrams illustrating various examples of connections between media server 102 and source servers 104 are shown. As will be described in detail below, control information passed between agent 106 and backup software 108, may provide media server 102 with additional or further instructions on how to proceed with a backup operation. Accordingly, control information for performing a backup operation may be distributed throughout a data system, thereby reducing the complexity and management requirements at media server 102. Since the control information may be locally modified and maintained (e.g., using agents 106 at source servers 104), media server 102 may be configured to perform a backup operation on a distributed system of arbitrarily large complexity, without having to maintain information about every system component. In fact, in some embodiments, media server 102 need only specify the ISS and the logical backup unit. A higher degree of parallelism, and thereby data transfer efficiency, may therefore be realized during backup operations using the techniques described herein.

Figure 6A:
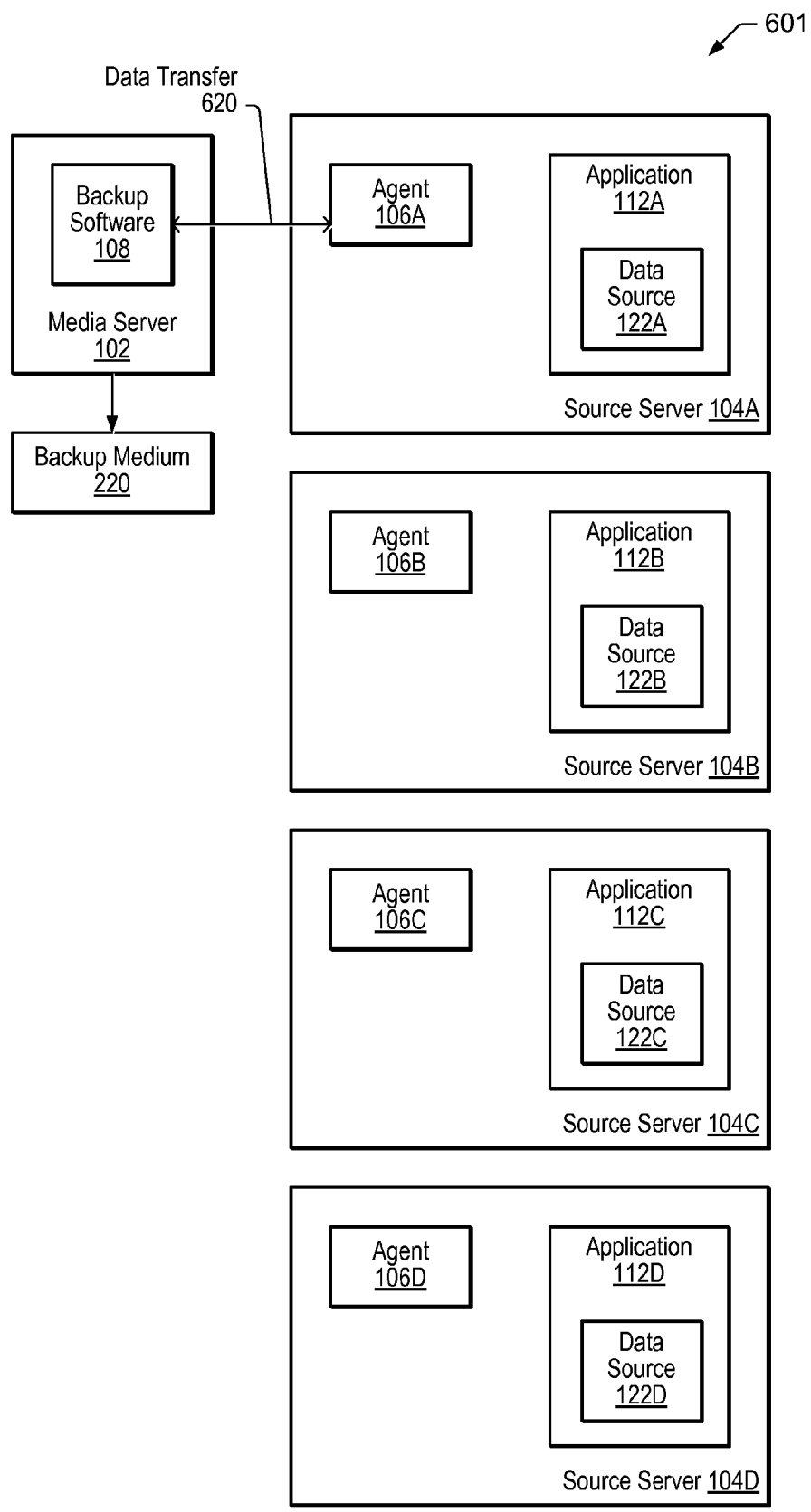
FIGS. 6A-6D illustrate various embodiments of network connections during a backup operation of a distributed application.

In FIG. 6A, media server 102 has established a connected with source server 104A, which is the ISS in system 601. As shown in this embodiment, backup software 108 communicates with agent 106A to effect a data transfer 620, which may include the bidirectional transfer of control information and/or data (e.g., from 122A). As described above, control information may indicate to media server 102 (via backup software 108) that a subsequent connection to source server 104B is to be established (e.g., after finishing the connection with source server 104A). Control information may instead indicate that two concurrent connections to source servers 104B and 104C should be subsequently established, either before or after data transfer 620 is completed. In short, in system 601, media server 102/backup software 108 may establish a connection with ISS 104A and receive instructions from agent 106A (based on control information) on how to proceed with the backup operation. Optionally, agent 106A can also send backup data via data transfer 620.

Figure 6B:
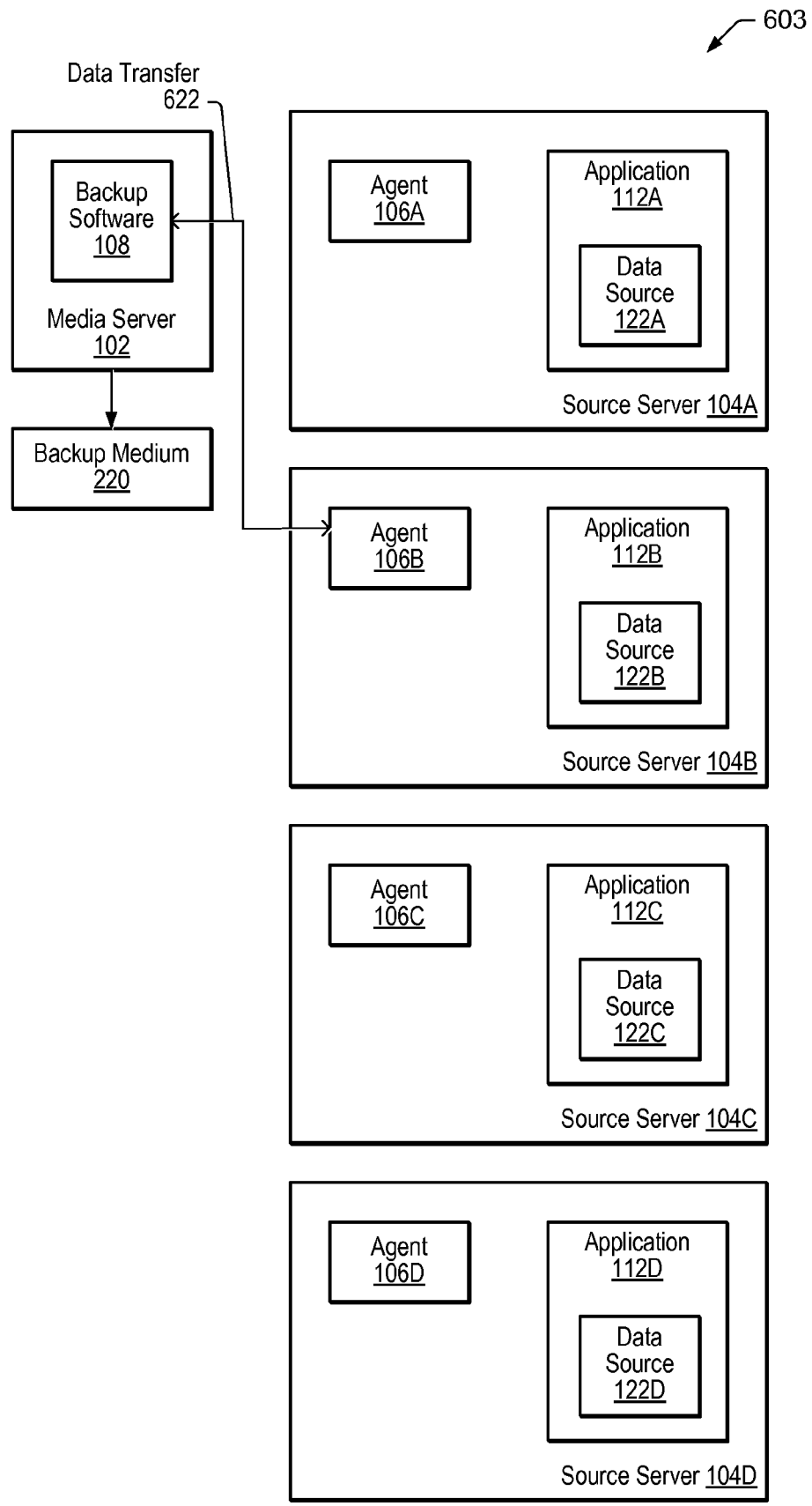

In FIG. 6B, system 603 is shown, which is another embodiment of a distributed data system. FIG. 6B illustrates a connection between media server 102 (backup software 108) and source server 104B (agent 106B). In this embodiment, source server 104B is an additional source server, to which media server 102 has been directed to establish a connection with (for example, by control information received previously from ISS 104A). Data transfer 622 may include backup data (e.g., from data source 122B) and/or control information (e.g., from agent 106B). Control information from agent 106B may indicate, for example, that backup data is to be received from data source 122B and/or that one or more subsequent connections to additional source servers are to be made.

Figure 6C:
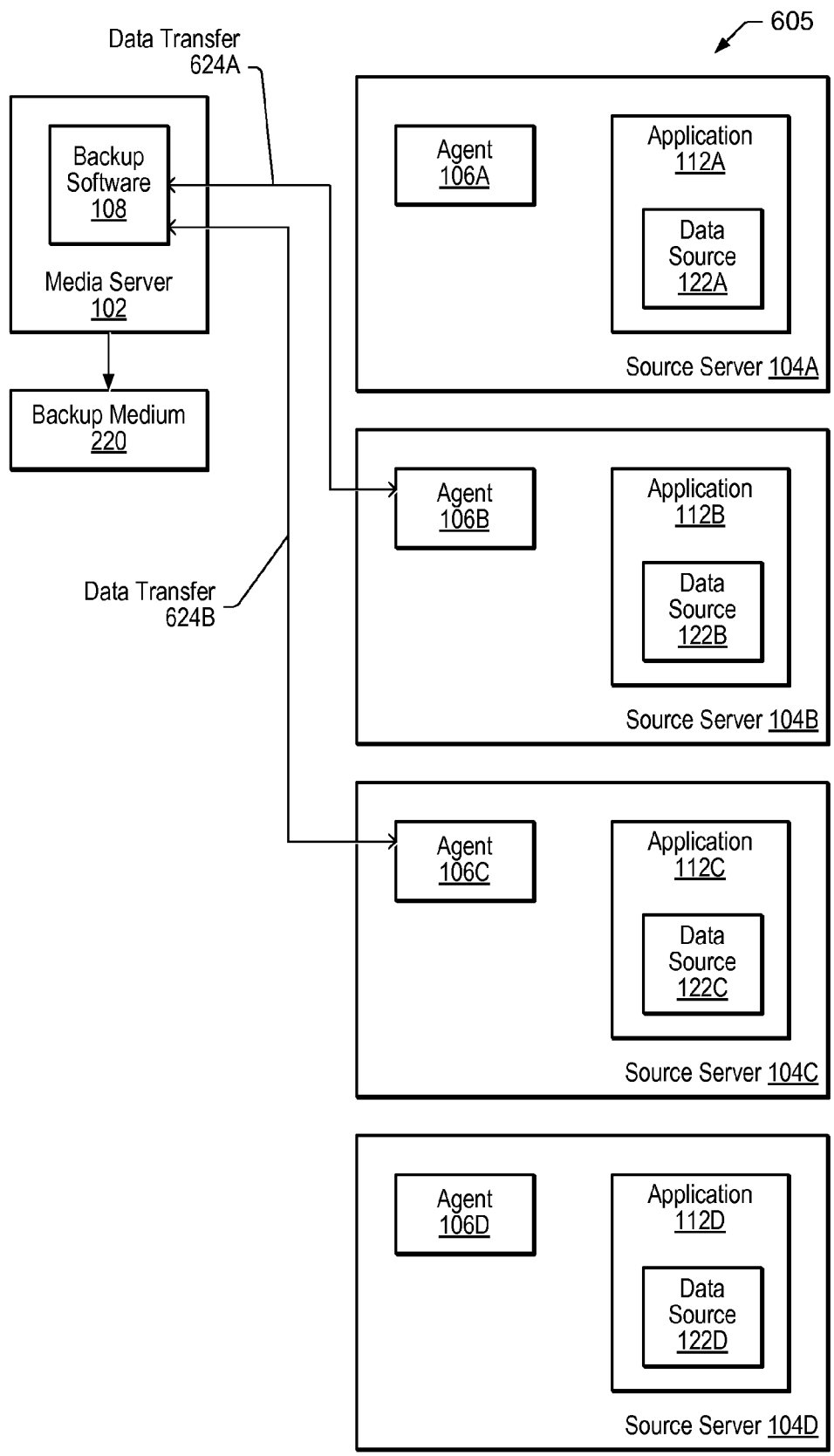

In FIG. 6C, system 605 is shown, which is yet another embodiment of a distributed data system. FIG. 6C illustrates a situation in which media server 102 has received an indication to establish concurrent connections with both source server 104B and 104C. This indication may have been received, for example, within control information received from ISS 104A. In such a situation, media server may establish concurrent connections with source servers 104B and 104C to effect data transfers 624A and 624B, respectively. Generally speaking, data transfers 624 may include control information and/or data. In the particular embodiment shown in FIG. 6C, data transfer 624A includes both control information (e.g., from agent 106B) and backup data (e.g., from data source 122B), while data transfer 624B does not include control information. Control information from agent 106B may specify, for example, that when data transfers 624 are both complete, media server 102 is to establish a connection to source server 104D to complete the backup. Thus, every source server's agent 106 that is involved in a backup operation need not pass control information to media server 102.

Figure 6D:
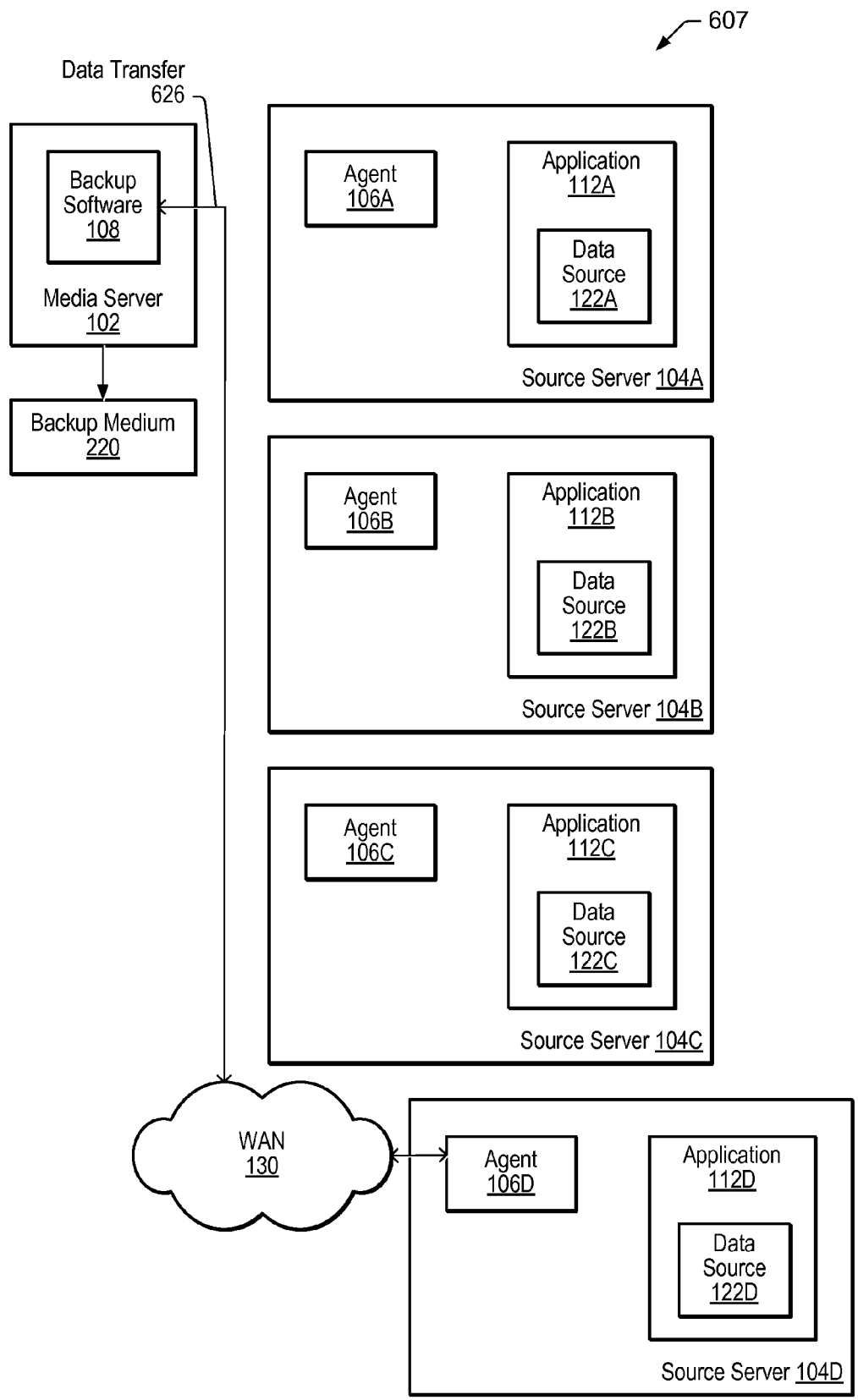

In FIG. 6D, system 607 is shown, which is still another embodiment of a distributed data system. In FIG. 6D, media server 102 is shown connecting to source server 104D via wide-area-network 130 in order to perform part of a backup operation. In various embodiments, WAN 130 is the Internet or a similar network. In different embodiments, the instruction to connect to source server 104D was provided to backup software 108 by any one of agents 106A-C, as indicated by control information from agents 106A-C, respectively. In one embodiment, agent 106D passes control information from agent 106D over data transfer 626 that specifies that source server 104D is the final source server for the current backup operation (e.g., for LBU 120). Accordingly, control information from agent 106D may indicate termination of the backup operation (i.e., that no additional source servers are indicated).

As noted above, FIGS. 6A-6D are exemplary embodiments. The techniques for backup and restore operations described herein are equally applicable to distributed data systems (e.g., distributed applications) of an arbitrary size. For example, techniques such as those described herein are applicable in an enterprise environment.

Figure 7:
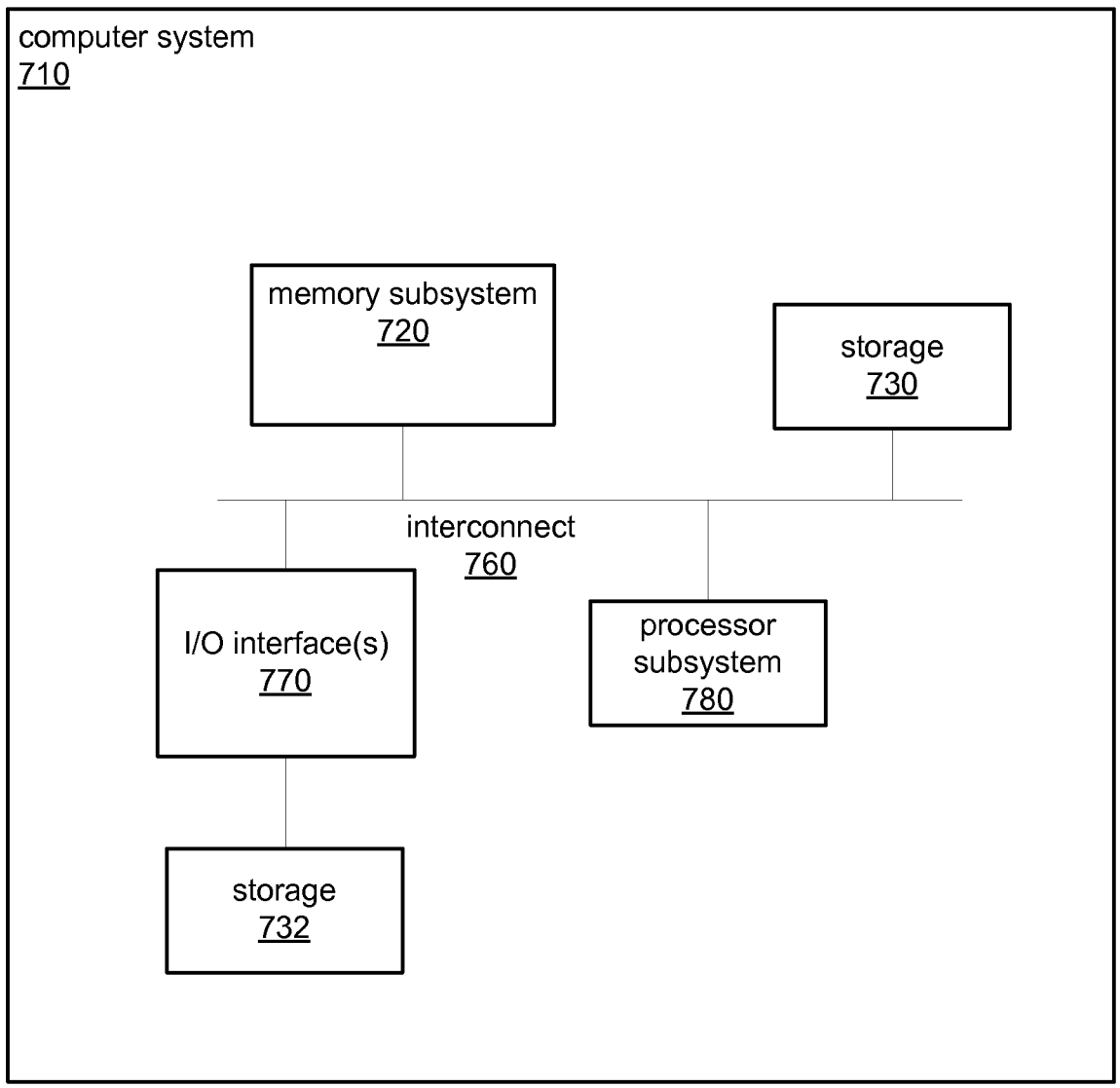
FIG. 7 illustrates one embodiment of a computer system.

FIG. 7 illustrates one embodiment of a computer system 710 illustrative of any of the computer systems described or illustrated herein. Computer system 710 may thus represent an embodiment of media server 102, source servers 104, etc. Computer system 710 may be any of various types of devices, including, but not limited to, a personal computer system, desktop computer, laptop or notebook computer, mainframe computer system, handheld computer, workstation, network computer, a consumer device such as a mobile phone, pager, or personal data assistant (PDA). Computer system 710 may also be any type of networkable peripheral device such as storage devices, switches, modems, routers, etc, or in general any type of networkable computing device. Although a single computer system 710 is shown in FIG. 7, system 710 may also be implemented as two or more computer system operating together.

Computer system 710 includes processor subsystem 780, which may be implemented using one or more individual processing units. Processor subsystem 780 may include one or more multi-processor cores, each with its own internal communication and buses. In various embodiments of computer system 710, multiple instances of processor subsystem 780 are coupled to interconnect 760. Processor subsystem 780 may couple across interconnect 760 to memory 720 and I/O interfaces 770.

I/O interfaces 770 may be any of various types of interfaces configured to couple with and communicate with other devices, according to various embodiments. In one embodiment I/O interfaces 770 represent a network interface configured to couple to one or more networks (e.g., the Internet, private networks, etc.).

Memory subsystem 720 is representative of various types of possible memory media, also referred to as "computer readable media." Memory subsystem 720 may be implemented using any suitable media type and/or storage architecture. In various embodiments, memory subsystem 720 may be implemented using different physical memory media, such as hard disk storage, floppy disk storage, removable disk storage, flash memory, random access memory (RAM—SRAM, EDO RAM, SDRAM, DDR SDRAM, Rambus® RAM, etc.), ROM (PROM, EEPROM, etc.), CD-ROM, DVD, and so on. In short, memory subsystem 720 is not limited to any particular type of physical media. Similarly, memory subsystem 720 may be found in a single location or may be distributed (e.g., in a SAN configuration).

In various embodiments, computer system 710 further includes one or more forms of storage, such as storage 730 and/or 732. I/O interface 770 is operational to transfer data via interconnect 760 to one or more internal or external components such as storage 732. Storage 730 may directly interface with interconnect 760. Storage 730, 732 may be a nonvolatile memory such as a magnetic media or may be a storage subsystem, such as a SAN or a storage array. In some embodiments, storage 730, 732 represents removable storage, such as a disk drive, optical media drive, tape drive, flash memory drive/card, or other type of storage media, as desired.

In some embodiments, memory subsystem 720 may include program instructions executable by the processor subsystem to implement backup and restore operations on distributed data systems as described above. Accordingly, computer system 710 may represent media server 102, with program instructions executable by processor subsystem 780 to implement backup software 108. In other embodiments, computer system 710 may represent one of source servers 104, with program instructions executable by processor subsystem 780 to implement agent 106 as described above.

Various techniques described herein may be used to support a high degree of parallelism during a backup or restore operation. For example, a large distributed application executing on numerous separate computer domains may be backed up to (or restored from) a media server cluster. In such embodiments, the control information may include not only an indication of the source server, but also indicate a connection parameter for a specific port on the media server. In this manner, certain embodiments can be used to significantly reduce the time required for backing up a large distributed application, by increasing data throughput using a number of parallel network connections to a media server cluster.

Note that in some embodiments, a media server may need "assistance" in establishing a connection with certain source servers. For example, a given media server may not belong to the same domain as an enterprise data system on which one or more source servers may be located. Accordingly, the media server may receive instructions on which source servers to contact in the enterprise domain, and may require credentials to be provided on its behalf in order to contact such source servers.

Various embodiments within the scope of the present disclosure may include storing instructions and/or data implemented in accordance with the foregoing description in a tangible computer-readable memory medium. Certain embodiments of these computer-readable memory media may include instructions and/or data that are computer executable to perform actions in accordance with the present disclosure. Generally speaking, such an article of manufacture may include storage media or memory media such as magnetic (e.g., disk) or optical media (e.g., CD-ROM and related technologies, DVD-ROM, etc.). The article of manufacture may also be either volatile or nonvolatile memory. For example, the article of manufacture may be (without limitation) SDRAM, DDR SDRAM, RDRAM, SRAM, flash memory, and of various types of ROM, etc. The article of manufacture may also be a transmission medium.

Further embodiments within the scope of the present disclosure may include signals such as electrical, electromagnetic, or optical signals, conveyed via a communication medium, link, and/or system (e.g., cable, network, etc.), whether wired, wireless or both. Such signals may carry instructions and/or data implemented in accordance with the foregoing description.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for performing a backup operation, comprising:
   a media server; and
   a plurality of servers, including a first server, coupled to the media server via one or more networks, wherein one or more of the plurality of servers stores data to be backed up;
   wherein the media server includes a processor subsystem and a memory subsystem, wherein the memory subsystem has stored therein a set of program instructions executable by the processor subsystem to:
     establish a first network connection with the first server to initiate the backup operation;
     receive first control information over the established first network connection, wherein the first control information specifies one or more tasks for the media server to perform as part of the backup operation, and wherein said first control information includes information indicative of one or more additional servers within the plurality of servers;
     subsequently establish network connections with the one or more additional servers indicated by the first control information, including a first additional server that is configured to provide second control information to the media server, wherein the second control information indicates that the media server is to establish a network connection with one or more subsequent servers within the plurality of servers;
     receive data to be backed up via at least one of the established network connections; and
     store the received data on a storage medium accessible to the media server.

2. The system of claim 1, wherein the first additional server is configured to provide data to be backed up to the media server.

3. The system of claim 1, wherein one of the subsequent servers is configured to provide final control information to the media server, wherein the final control information indicates that no more servers within the plurality of servers are to be contacted by the media server as part of the backup operation.

4. The system of claim 1, wherein the plurality of servers is configured to store data of a distributed application.

5. The system of claim 4, wherein the distributed application is a collaborative application.

6. The system of claim 1, wherein the media server, in response to the first control information, is configured to sequentially establish network connections with at least some of the one or more additional servers.

7. The system of claim 1, wherein the media server, in response to the first control information, is configured to concurrently establish network connections with at least some of the one or more additional servers.

8. The system of claim 1, wherein the first server is configured, in response to the establishment of the first network connection, to lock data on the remaining ones of the plurality of servers, wherein the locked data is unlocked after completion of the backup operation.

9. The system of claim 1, wherein the plurality of servers includes servers located in different domains.

10. The system of claim 1, wherein the first network connection is an NDMP connection.

11. A non-transitory computer-readable memory medium having stored therein program instructions, wherein the program instructions include a first set of program instructions that are executable on a media server to:
   establish a first network connection with a first server within a distributed data system;
   receive first control information over the established first network connection, wherein said first control information includes information indicative of one or more additional servers within the distributed data system, and wherein the first control information specifies one or more tasks for the media server to perform as part of a backup operation;
   subsequently establish network connections with the one or more additional servers indicated by the first control information;
   receive data to be backed up via at least one of the established network connections; and
   store the received data on a storage medium accessible to the media server;
   wherein the program instructions include a second set of program instructions that are executable on the first server to:
     establish the first network connection with the media server, wherein the media server is configured to provide access to one or more backup storage media; and
     send the first control information to the media server.

12. The non-transitory computer-readable memory medium of claim 11, wherein the first set of program instructions are further executable on the media server to:
   receive an indication of the data to be backed up, as well as an indication of the first server.

13. The non-transitory computer-readable memory medium of claim 11, wherein the first set of program instructions are further executable on the media server to:
   sequentially establish network connections with at least some of the one or more additional servers.

14. The non-transitory computer-readable memory medium of claim 11, wherein the first set of program instructions are further executable on the media server to:

concurrently establish network connections with at least some of the one or more additional servers.

15. The non-transitory computer-readable memory medium of claim 11, wherein the first set of program instructions are further executable to:

receive second control information from a first of the one or more additional servers indicated by the first control information, and wherein the second control information indicates that the media server is to establish a network connection with one or more subsequent servers.

16. A non-transitory computer-readable memory medium having stored therein program instructions that are executable on a media server to:

establish a first network connection with a first server within a distributed data system, wherein the media server is configured to provide access to one or more backup storage media; and receive first control information over the established first network connection, wherein said first control information includes information indicative of one or more additional servers within a plurality of servers in the distributed data system to be contacted by the media server as part of a backup operations, wherein the first control information specifies one or more tasks for the media server to perform as part of the backup operation;

subsequently establish network connections with the one or more additional servers indicated by the first control information;

receive data to be backed up via at least one of the established network connections; and store the received data on a storage medium accessible to the media server.

17. The non-transitory computer-readable memory medium of claim 16, wherein the program instructions are further executable on the media server to:

in response to establishing the first network connection, lock data on the remaining ones of the plurality of servers, wherein the locked data is unlocked after completion of the backup operation.

18. The non-transitory computer-readable memory medium of claim 16, wherein the first control information indicates that the media server is to sequentially establish network connections with at least some of the one or more additional servers.

19. The non-transitory computer-readable memory medium of claim 16, wherein the first control information indicates that the media server is to concurrently establish asynchronous network connections with at least some of the one or more additional servers.

20. The non-transitory computer-readable memory medium of claim 16, wherein the program instructions are further executable to:

receive second control information from a first of the one or more additional servers indicated by the first control information, and wherein the second control information indicates that the media server is to establish a network connection with one or more subsequent servers within the plurality of servers.

* * * * *